(12) United States Patent
Goto et al.

(10) Patent No.: US 12,467,201 B2
(45) Date of Patent: Nov. 11, 2025

(54) REFINER

(71) Applicant: AIKAWA IRON WORKS CO., LTD., Shizuoka (JP)

(72) Inventors: Makoto Goto, Shizuoka (JP); Makoto Suzuki, Shizuoka (JP)

(73) Assignee: AIKAWA IRON WORKS CO., LTD., Shizuoka (JP)

( * ) Notice: Subject to any disclaimer, the term of this patent is extended or adjusted under 35 U.S.C. 154(b) by 0 days.

(21) Appl. No.: 18/646,766

(22) Filed: Apr. 26, 2024

(65) Prior Publication Data

US 2024/0296736 A1 Sep. 5, 2024

Related U.S. Application Data

(62) Division of application No. 17/583,143, filed on Jan. 24, 2022, now Pat. No. 12,215,462.

(30) Foreign Application Priority Data

Nov. 15, 2021 (JP) ................. 2021-185514

(51) Int. Cl.
*D21D 1/38* (2006.01)
*B02C 7/02* (2006.01)
(Continued)

(52) U.S. Cl.
CPC ............. *D21D 1/30* (2013.01); *B02C 7/02* (2013.01); *B02C 7/12* (2013.01); *D21D 1/002* (2013.01);
(Continued)

(58) Field of Classification Search
CPC .......... D21D 1/006; D21D 1/008; D21D 1/22; D21D 1/30; D21D 1/303; D21D 1/306;
(Continued)

(56) References Cited

U.S. PATENT DOCUMENTS 3,451,630 A 6/1969 Pav
5,042,726 A * 8/1991 Reinhall .................. D21D 1/22
241/261.3
(Continued)

FOREIGN PATENT DOCUMENTS

EP 3885489 A1 9/2021
JP S5482408 A 6/1979
(Continued)

OTHER PUBLICATIONS

Office Action in JP Application No. 2021-185514, mailed Jan. 11, 2022. 8pp.
(Continued)

*Primary Examiner* — Jared O Brown
(74) *Attorney, Agent, or Firm* — HAUPTMAN HAM, LLP

(57) ABSTRACT

A refiner for beating a raw material supplied between a stator beating part and a rotor beating part, and discharging the beaten raw material, the refiner including a rotating shaft, the rotor beating part attached to the rotating shaft, a motor configured to drive the rotating shaft; and a motor control part configured to variably control a rotation of the motor. The rotation of the motor of the rotor beating part is controlled by the motor control part to beat the raw material.

1 Claim, 6 Drawing Sheets

(51) Int. Cl.
  *B02C 7/12* (2006.01)
  *D21D 1/00* (2006.01)
  *D21D 1/22* (2006.01)
  *D21D 1/30* (2006.01)

(52) U.S. Cl.
  CPC ............. *D21D 1/006* (2013.01); *D21D 1/008* (2013.01); *D21D 1/22* (2013.01); *D21D 1/306* (2013.01); *D21D 1/38* (2013.01)

(58) Field of Classification Search
  CPC .... D21D 1/38; B02C 2/10; B02C 7/02; B02C 7/12
  See application file for complete search history.

(56) References Cited

U.S. PATENT DOCUMENTS

| | | | | |
|---|---|---|---|---|
| 5,836,530 | A * | 11/1998 | Pilao | D21D 1/22 241/261.1 |
| 6,617,720 | B1 * | 9/2003 | Egan, III | D21D 1/30 241/259.1 |
| 2003/0029587 | A1 | 2/2003 | Aikawa | |
| 2011/0089273 | A1 * | 4/2011 | Lindroos | D21D 1/22 241/291 |
| 2016/0362835 | A1 * | 12/2016 | Aikawa | D21D 1/22 |
| 2017/0320239 | A1 * | 11/2017 | Winter | D21D 1/30 |
| 2019/0203417 | A1 | 7/2019 | Anderson | |
| 2021/0301470 | A1 * | 9/2021 | Huhtanen | B02C 7/12 |

FOREIGN PATENT DOCUMENTS

| | | |
|---|---|---|
| JP | S60224891 A | 11/1985 |
| JP | 2006063490 A | 3/2006 |
| JP | 2006299493 A | 11/2006 |
| JP | 4518711 B2 | 8/2010 |
| KR | 20150003375 U * | 9/2015 |
| KR | 2020150003375 U | 9/2015 |
| WO | 9952197 A1 | 10/1999 |

OTHER PUBLICATIONS

Extended European Search Report in EP Application No. 22152035.6, dated Jul. 8, 2022. 7pp.

* cited by examiner

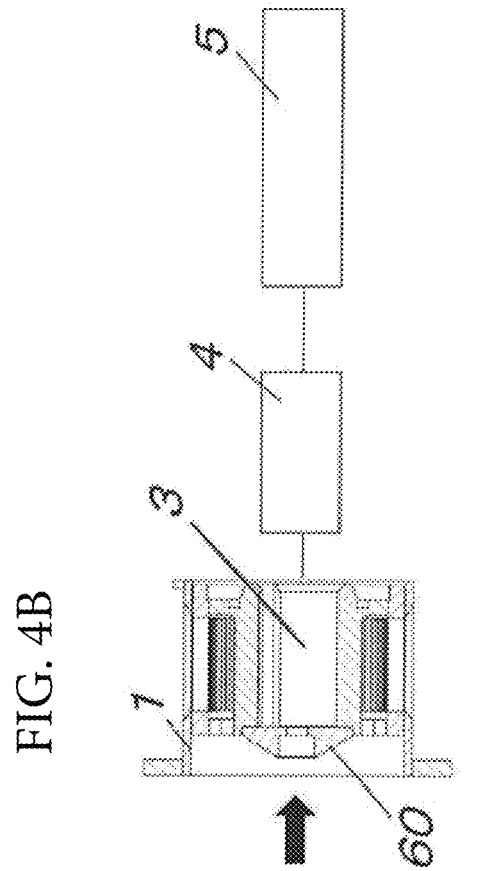
FIG. 4A
FIG. 4B
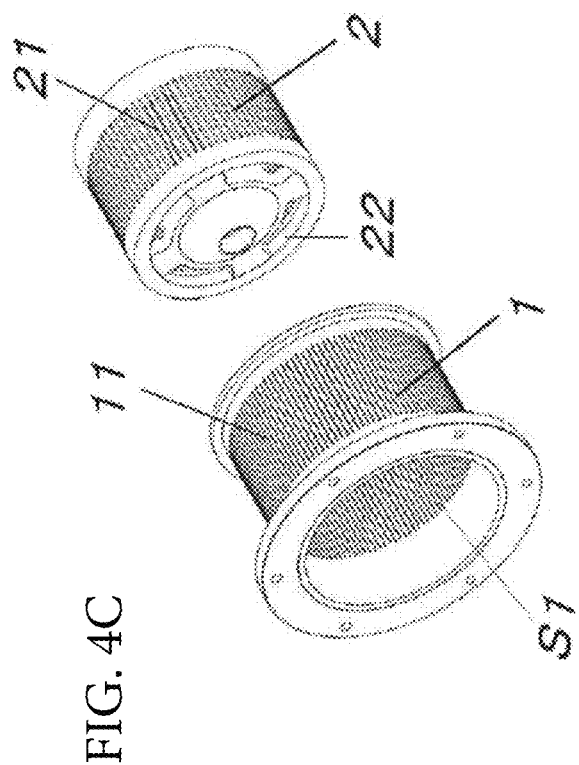
FIG. 4C

REFINER

RELATED APPLICATION

The present application is a divisional application of U.S. patent application Ser. No. 17/583,143 filed on Jan. 24, 2022, which claims priority to Japanese Application Number 2021-185514 filed Nov. 15, 2021, the disclosures of which applications are hereby incorporated by reference herein in their entirety.

TECHNICAL FIELD

The instant application relates to a refiner, and in particular to, a refiner for, instead of adjusting a gap between a stator beating part and a rotor beating part, variably controlling a rotation of the motor of the rotor beating part to correspond to a raw material.

BACKGROUND TECHNOLOGY

There is a refiner as a device for beating pulp (for example, the refiner in Patent Literature 1).

This refiner beats the raw material by adjusting the gap between the stator beating part and the rotor beating part.

PRIOR ART REFERENCES

Patent Literature

[Patent Literature 1] Japanese Patent No. 4518711

SUMMARY

Problems to be Solved

However, when the raw material is, for example, a material having short fibers or a material having no stiffness, there is a limitation in adjusting the gap between the stator beating part and the rotor beating part, and such raw material could not be dealt with.

As a result of trial and error, the inventor has discovered to correspond to the raw material by focusing on, instead of adjusting the gap between the stator beating part and the rotor beating part, variably controlling the rotation of the motor of the rotor beating part.

The present application has been made in consideration of the above circumstances, and has an object to provide a refiner configured to correspond to the raw material by, instead of adjusting the gap between the stator beating part and the rotor beating part, variably controlling the rotation of the motor of the rotor beating part.

Means for Solving Problems

The refiner according to at least one embodiment is a refiner that beats the raw material supplied between the stator beating part and the rotor beating part and discharges the beaten raw material, and includes a rotating shaft, a rotor beating part attached to the rotating shaft, a motor for driving the rotating shaft, and a motor control part for variably controlling a rotation of the motor, wherein the rotation of the motor of the rotor beating part is variably controlled by the motor control part to beat the raw material.

A refiner according to at least one embodiment is the refiner, wherein the rotor beating part includes a first rotary blade provided on an outer periphery of an end face of a rotor, and a second rotary blade being the end face of the rotor and provided on an inner side of the first rotary blade; the stator beating part is a fixed blade arranged at an end part of a first ring-shaped body and has a slit; the fixed blade of the stator beating part is positioned between the first rotary blade and the second rotary blade, and a second ring-shaped body with a slit for discharging the raw material beaten by the stator beating part and the rotor beating part is positioned on an outer side of the first ring-shaped body.

A refiner according to at least one embodiment is the refiner, wherein the rotor beating part is a rotary blade provided radially on an end part of the rotor, the stator beating part is a fixed blade provided radially on an end part of a first ring-shaped body, wherein the fixed blade and the rotary blade are facing each other, a ring-shaped body includes a slit for discharging the raw material beaten by the stator beating part and the rotor beating part, and the ring-shaped body is positioned on an outer side of the rotary blade and the fixed blade.

A refiner according to at least one embodiment is the refiner, wherein the rotor beating part is provided with a raw material supply port for taking in the raw material inside the rotor beating part on an end face of the rotor, and a rotary blade on a side surface of the rotor having a slit, respectively, and the stator beating part is a fixed blade arranged on the side surface of a cylindrical body and has a slit.

A refiner according to at least one embodiment is the refiner, wherein the rotating shaft is supported by a magnetic bearing, and a rotational rate of the motor is 4000 rpm or more.

Effect

With respect to the refiner according to at least one embodiment, even if the raw material is, for example, a material having short fibers or a material having no stiffness, the raw material could be beaten, not by adjusting the gap between the stator beating part and the rotor beating part, but by variably controlling the rotation of the motor of the rotor beating part.

With respect to the refiner according to at least one embodiment, even if the raw material is, for example, a material with short fibers or a material with no stiffness, the raw material could be beaten, not by adjusting the gap between the stator beating part and the rotor beating part, but by variably controlling the rotation of the motor of the rotor beating part by the motor control part, and because a fixed blade of the stator beating part is positioned between a first rotary blade and a second rotary blade, a beating effect of the raw material could be increased.

With respect to the refiner according to at least one embodiment, even if the raw material is, for example, a material with short fibers or a material with no stiffness, the raw material could be beaten, not by adjusting the gap between the stator beating part and the rotor beating part, but by variably controlling the rotation of the motor of the rotor beating part by the motor control part.

With respect to the refiner according to at least one embodiment, even if the raw material is, for example, a material with short fibers or a material with no stiffness, the raw material could be beaten, not by adjusting the gap between the stator beating part and the rotor beating part, but by variably controlling the rotation of the motor of the rotor beating part by the motor control part, and because the raw material, apart from the ones being directly guided to the gap between the stator beating part and the rotor beating part, is also directed from the raw material supply port of the rotor beating part to the gap between the stator beating part and the rotor beating part, the beating effect of the raw material could be increased.

BRIEF DESCRIPTION OF THE DRAWINGS

FIGS. 4A-4C show another embodiment of the refiner different from the embodiment in FIGS. 3A-3C, wherein FIG. 4A is a schematic front view, FIG. 4B is a schematic cross-sectional view taken along the line A-A in FIG. 4A, and FIG. 4C is a schematic exploded perspective view of FIG. 4A shown in a disassembled state.

FIGS. 5A-5B show a raw material flow of FIGS. 4A-4C, wherein FIG. 5A is a schematic cross-sectional view showing the raw material flow in FIG. 4B, and FIG. 5B is a schematic perspective view of FIG. 5A viewed from an oblique direction.

FIGS. 6A-6D show another embodiment of the refiner different from the embodiment in FIGS. 4A-4C, wherein FIG. 6A is a schematic front view, FIG. 6B is a schematic cross-sectional view taken along the line A-A in FIG. 6A, FIG. 6C is a schematic exploded perspective view of FIG. 6A shown in a disassembled state, and FIG. 6D is a schematic exploded perspective view of FIG. 6C viewed from a different direction.

FIGS. 7A-7D show another embodiment of the refiner different from the embodiment in FIGS. 6A-6D, wherein FIG. 7A is a schematic front view, FIG. 7B is a schematic cross-sectional view taken along the line A-A in FIG. 7A, FIG. 7C is a schematic exploded perspective view of FIG. 7A shown in a disassembled state, and FIG. 7D is a schematic exploded perspective view of FIG. 7C viewed from a different direction.

DETAILED DESCRIPTION

A refiner according to an embodiment of the present application will be described with reference to the drawings.

Figure 1A:
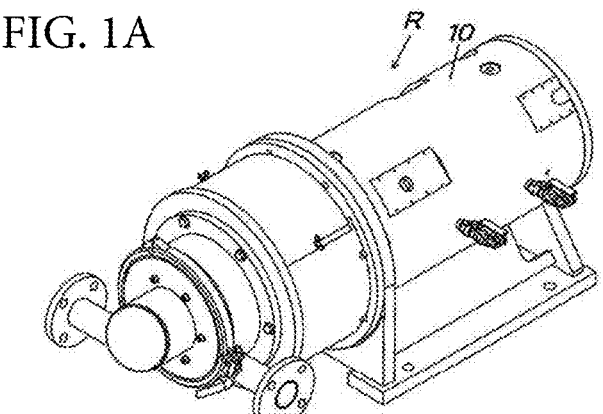
FIG. 1A is a schematic perspective view of a refiner according to an embodiment of the present application.
Figure 1B:
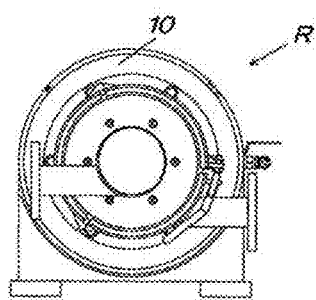
FIG. 1B is a schematic front view of FIG. 1A.
Figure 1C:
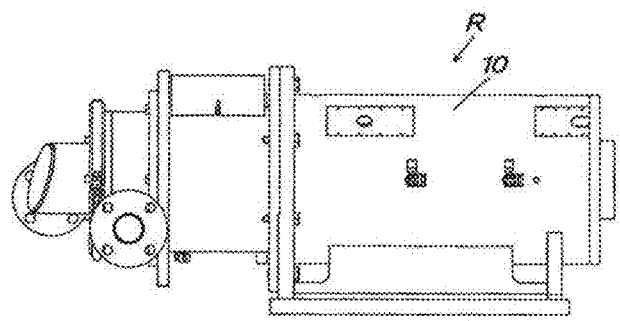
FIG. 1C is a schematic right side view of FIG. 1B.

In FIGS. 1A-1C, reference R is a refiner, and the refiner R supplies a raw material (the raw material is, for example, cellulose) between a stator beating part 1 and a rotor beating part 2, and beats the raw material (beat is, for example, to mechanically beat to nano size and form cellulose nanofiber).

In a main body 10, a rotating shaft 3 is provided. The rotor beating part 2 is attached to the rotating shaft 3 by an attachment member 60.

Reference numeral 4 is a motor for driving the rotating shaft 3 (the motor is, for example, a spindle motor), and a rotation of the motor 4 is controlled by a motor control part 5. A high rotation range of the motor 4 is, for example, 4000 rpm or more, preferably in a range of 4000 rpm~60,000 rpm, and this wide variable range is controlled by the motor control part 5.

Reference numeral 6 is a magnetic bearing (a radial magnetic bearing) that supports the rotating shaft 3 by magnetic levitation, and reference numeral 7 is a magnetic bearing (an axial radial magnetic bearing) that supports the rotating shaft 3 by magnetic levitation; and these magnetic bearing (the radial magnetic bearing) 6 and the magnetic bearing (the axial radial magnetic bearing) 7 are controlled by a magnetic bearing control part 8 to form a gap between the rotating shaft 3 and the magnetic bearings 6, 7 by electromagnetic force so that the rotating shaft 3 rotating at high speed does not contact the magnetic bearings 6, 7.

The gap t (see FIG. 2) between the stator beating part 1 and the rotor beating part 2 described above has a constant dimension that cannot be variably changed, and the raw material is beaten, not by adjusting the gap t between the stator beating part 1 and the rotor beating part 2, but by variably controlling the rotation of the motor 4 of the rotor beating part 2.

That is, when the raw material is not sufficiently beaten by the rotation of the motor 4, the rotation of the motor 4 is increased to a higher speed by the motor control part 5 to beat the raw material.

Figure 3A:
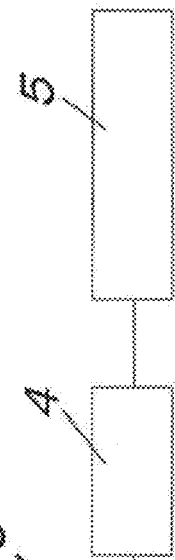
FIG. 3A is a schematic front view of a main part of the refiner in FIGS. 1A-1C.
Figure 3B:
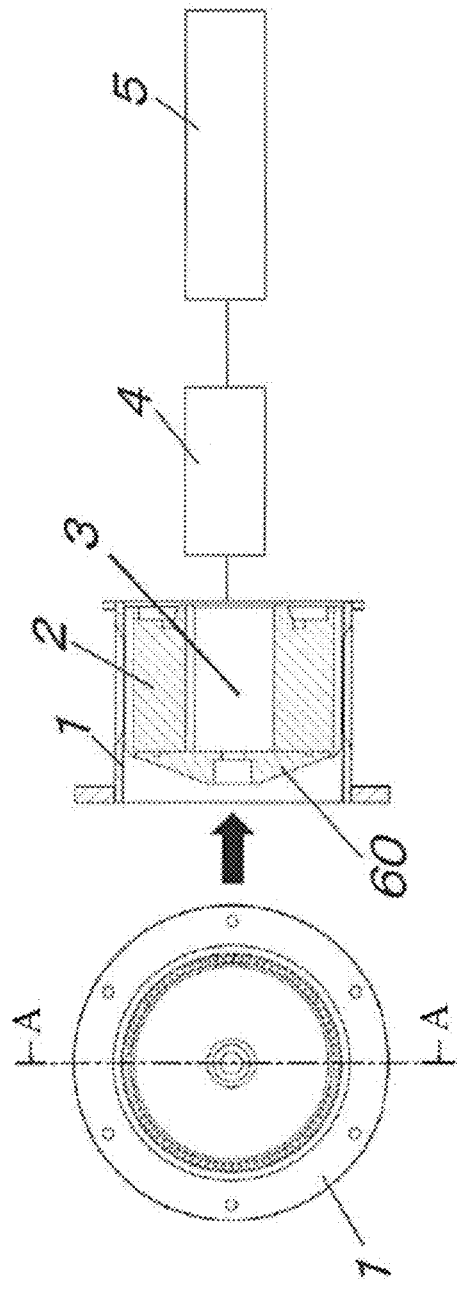
FIG. 3B is a schematic cross-sectional view taken along the line A-A in FIG. 3A.
Figure 3C:
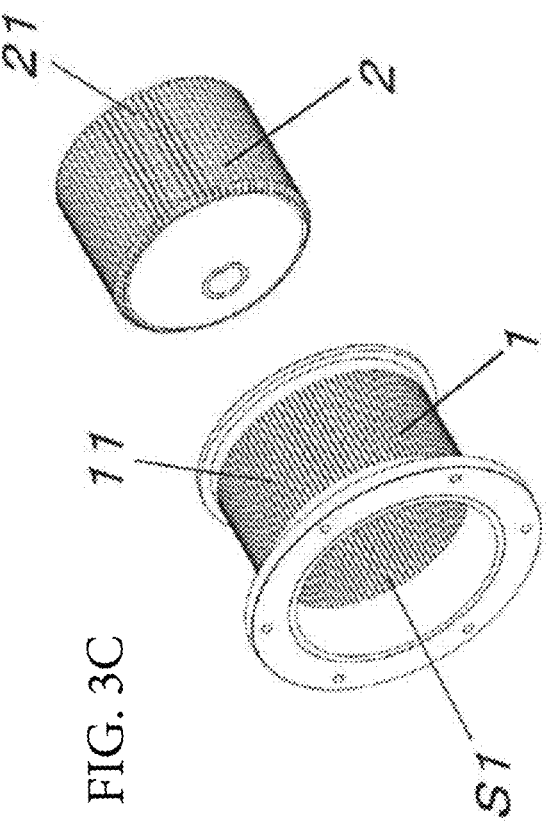
FIG. 3C is a schematic exploded perspective view of FIG. 3A shown in a disassembled state.

As shown in FIGS. 3A-3C, the rotor beating part 2 is, for example, a cylindrical body and provided with a rotary blade 21 on a side surface of the cylindrical body, and the stator beating part 1 is a cylindrical body and a fixed blade 11 arranged on a side surface of this cylindrical body and has a slit S1, and the raw material is beaten, not by adjusting the gap between the stator beating part 1 and the rotor beating part 2, but by variably controlling the rotation of the motor 4 of the rotor beating part 2.

Therefore, the raw material supplied from a raw material inlet 20 is beaten between the stator beating part 1 and the rotor beating part 2, and the beaten raw material is discharged from a raw material outlet 30 to an outer side of the main body 10.

According to this refiner R, even if the raw material is, for example, a material having short fibers or a material having no stiffness, the raw material could be beaten according to the raw material such as those having short fibers and those having no stiffness, not by adjusting the gap t between the stator beating part 1 and the rotor beating part 2, but by controlling the rotation of the motor 4 of the rotor beating part 1 at a high speed by the motor control part 5.

The stator beating part 1 and the rotor beating part 2 of the refiner R of the present application are not limited to the above-mentioned stator beating part 1 and the rotor beating part 2 of the refiner R in FIGS. 1A-3C, but could be the ones shown in FIGS. 4A-4C and 5A-5B.

Figure 2:
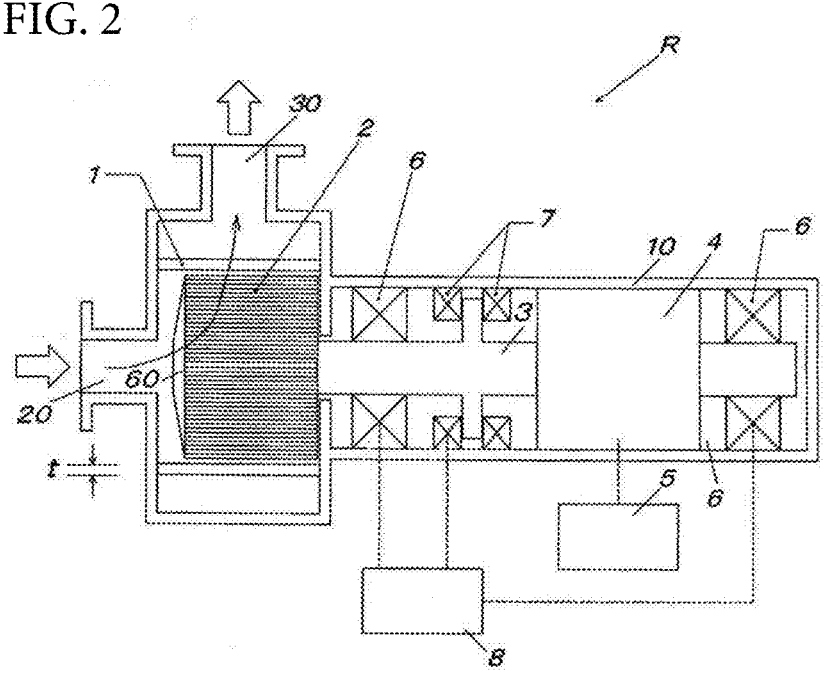
FIG. 2 is a schematic cross-sectional view of FIG. 1A.

That is, the refiner R shown in FIGS. 4A-4C and 5A-5B, similarly to the refiner R of the above-mentioned embodiment, also supplies a raw material (the raw material is, for example, cellulose) between the stator beating part 1 and the rotor beating part 2, and beats the raw material (beat is to, for example, mechanically beat the cellulose into nano size and form cellulose nanofiber); and the refiner R of this embodiment is a refiner R configured from the stator beating part 1 and the rotor beating part 2 shown in FIG. 2 being replaced with the stator beating part 1 and rotor beating part 2 shown in FIGS. 4A-4C and 5A-5B.

The refiner R includes a rotating shaft 3, a rotor beating part 2 attached to the rotating shaft 3, a motor 4 for driving the rotating shaft 3, and a motor control part 5 for controlling a rotational rate of the motor 4.

A gap t between the stator beating part 1 and the rotor beating part 2 is a constant dimension that cannot be changed, and instead of adjusting the gap between the stator beating part 1 and the rotor beating part 2, the rotational rate of the motor 4 of the rotor beating part 2 is variably controlled according to the raw material such as those having short fibers and those having no stiffness.

Figure 5A:
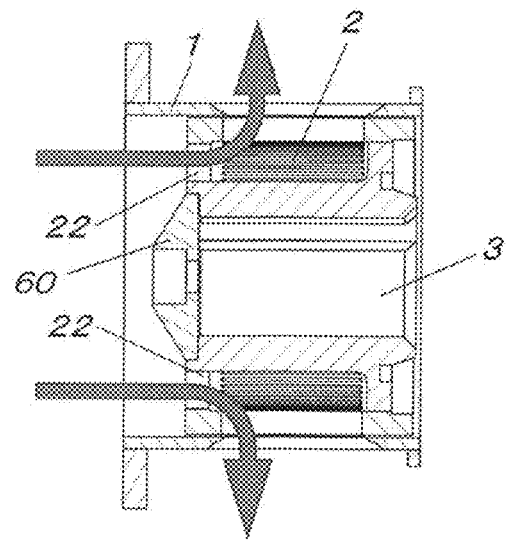
Figure 5B:
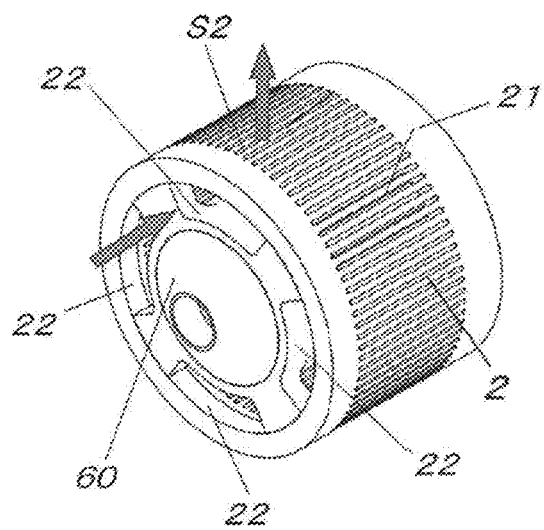
Figure 6C:
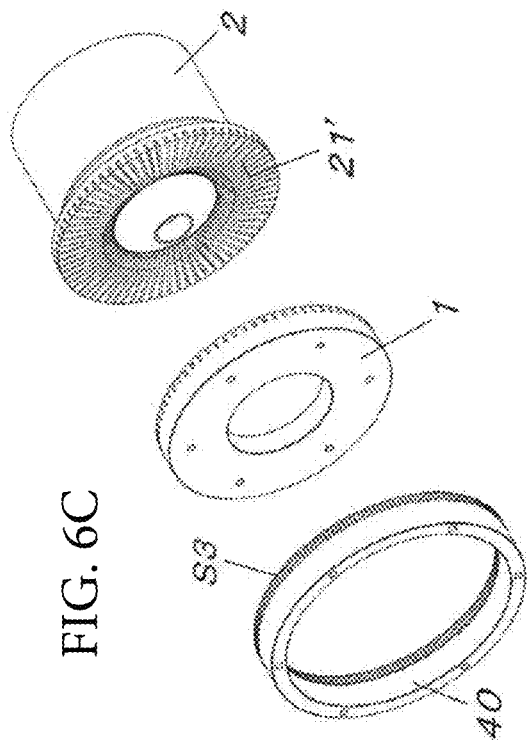
Figure 6D:
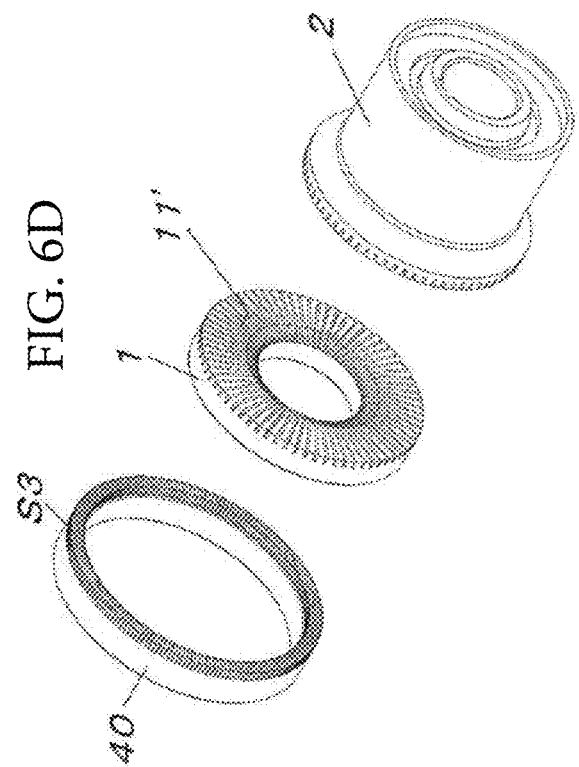
Figure 6B:
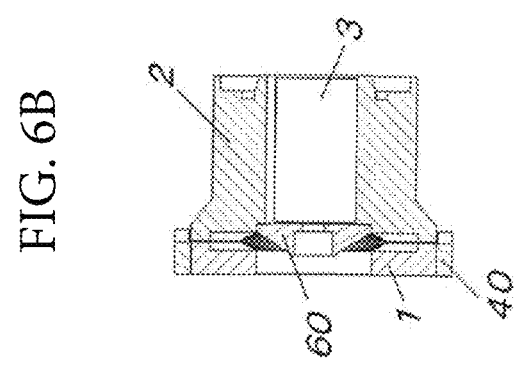
Figure 6A:
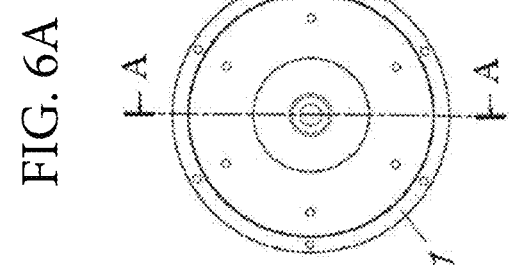
Figure 7D:
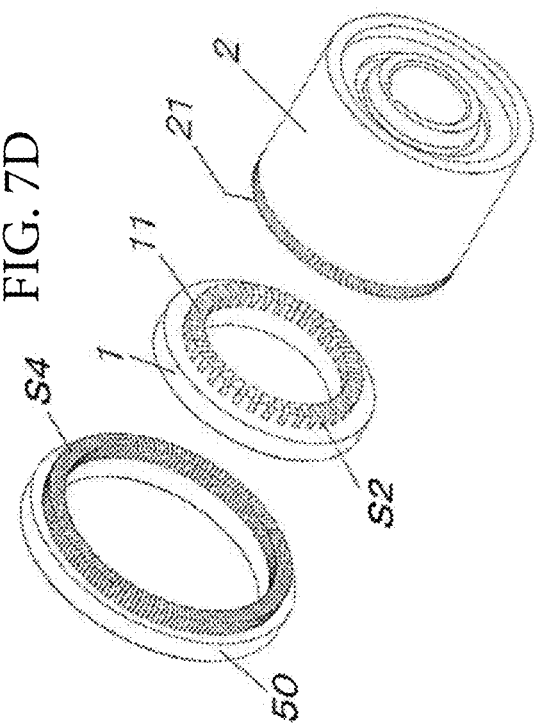
Figure 7C:
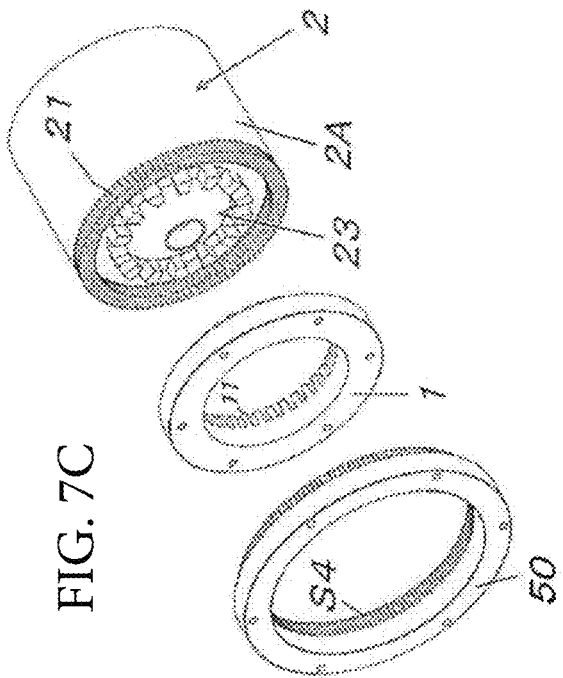
Figure 7B:
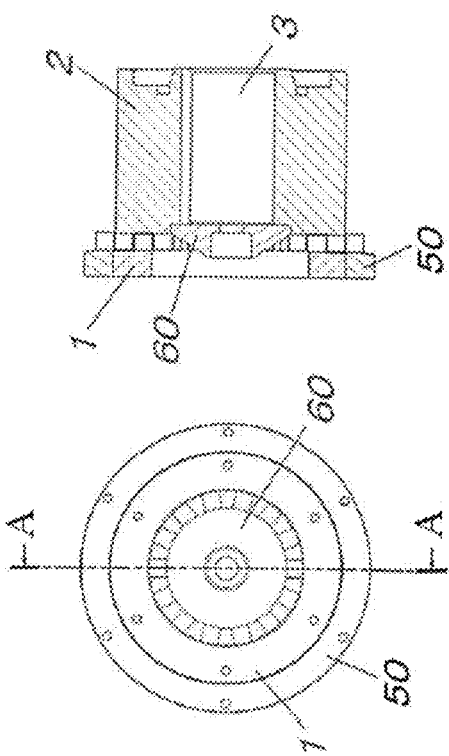
Figure 7A:
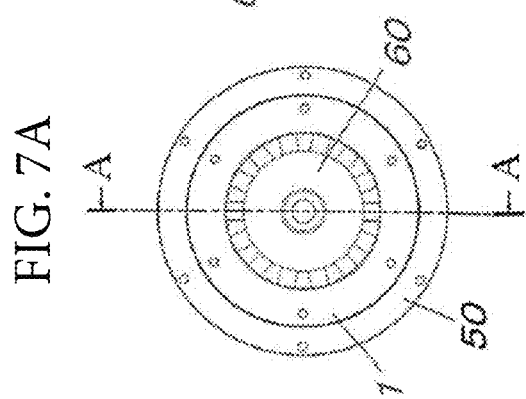

As shown in FIGS. 5A-5B, the rotor beating part 2 is a cylindrical body, and has a raw material supply port 22 at an end face of the cylindrical body for taking in the raw material inside the rotor beating part 2 and a rotary blade 21 on a side surface of the cylindrical body, respectively; and the stator beating part 1 is a cylindrical body, and is a fixed blade arranged on a side surface of the cylindrical body and has a slit S2.

In the refiner R shown in FIGS. 4A-4C and 5A-5B, even if the raw material is, for example, a material having short fibers or a material having no stiffness, the raw material could be beaten, according to the raw material such as those having short fibers and those having no stiffness, not by adjusting the gap between the stator beating part 1 and the rotor beating part 2, but by controlling the rotation of the motor 4 of the rotor beating part 2 at a high speed by the motor control part 5 similarly to the refiner R shown in FIGS. 1A-3C, of course, and the raw material, apart from the ones being directly guided to the gap between the stator beating part 1 and the rotor beating part 2, is also directed from the raw material supply port 22 of the rotor beating part 2 to the gap between the stator beating part 1 and the rotor beating part 2; thereby, the beating effect of the raw material could be increased.

The stator beating part and the rotor beating part of the refiner R of the present application are not limited to the stator beating part 1 and the rotor beating part 2 of the refiner R shown in FIGS. 1A-5B, but could be the stator beating part 1 and the rotor beating part 2 shown in FIGS. 6A-6D.

That is, the refiner R shown in FIGS. 6A-6D, similarly to the refiner R of the above-mentioned embodiment, supplies a raw material (the raw material is, for example, cellulose) between the stator beating part 1 and the rotor beating part 2 and beats the raw material (beat is, for example, to mechanically beat the cellulose to nano size and form cellulose nanofiber); and the refiner R of this embodiment is a refiner R configured from the stator beating part 1 and the rotor beating part 2 shown in FIG. 2 being replaced with the stator beating part 1 and rotor beating part 2 shown in FIGS. 6A-6D.

The refiner R includes a rotating shaft 3, a rotor beating part 2 attached to the rotating shaft 3, a motor 4 for driving the rotating shaft 3, and a motor control part 5 for controlling a rotation of the motor 4.

A gap t between the stator beating part 1 and the rotor beating part 2 is a constant dimension that cannot be variably changed, and instead of adjusting the gap between the stator beating part 1 and the rotor beating part 2, the rotation of the motor 4 of the rotor beating part 2 is variably controlled according to the raw material such as those having short fibers and those having no stiffness.

The rotor beating part 2 is a rotary blade 21' provided radially at an end part of a rotor, and the stator beating part 1 is a fixed blade 11' provided radially at an end part of a first ring-shaped body wherein the fixed blade 11' and the rotary blade 21' face each other.

A ring-shaped body 40 having a slit S3 for discharging the raw material beaten by the stator beating part 1 and the rotor beating part 2 is positioned on an outer side of the rotary blade 21' and the fixed blade 11', and the rotation of the motor 4 of the rotor beating part 2 is variably controlled to beat the raw material.

According to this refiner R, even if the raw material is, for example, a material having short fibers or a material having no stiffness, the raw material could be beaten, not by adjusting the gap between the stator beating part 1 and the rotor beating part 2, but by controlling the rotation of the motor 4 of the rotor beating part 2 by the motor control part 5, similarly to the refiner R shown in FIGS. 1A-3C.

The stator beating part and the rotor beating part of the refiner R of the present application are not limited to the above-mentioned stator beating part 1 and the rotor beating part 2 of the refiner R in FIGS. 1A-6D, but could be the stator beating part 1 and rotor beating part 2 shown in FIGS. 7A-7D.

That is, the refiner R shown in FIGS. 7A-7D, similarly to the refiner R of the above-mentioned embodiment, also supplies a raw material (the raw material is, for example, cellulose) between the stator beating part 1 and the rotor beating part 2, and beats the raw material (beat is to, for example, mechanically beat the cellulose into nano size and form cellulose nanofiber); and the refiner R of this embodiment is a refiner R configured from the stator beating part 1 and the rotor beating part 2 shown in FIG. 2 being replaced with the stator beating part 1 and rotor beating part 2 shown in FIGS. 7A-7D.

The refiner R includes a rotating shaft 3, a rotor beating part 2 attached to the rotating shaft 3, a motor 4 for driving the rotating shaft 3, and a motor control part 5 for controlling a rotational rate of the motor 4.

A gap t between the stator beating part 1 and the rotor beating part 2 is a constant dimension that cannot be changed, and instead of adjusting the gap between the stator beating part 1 and the rotor beating part 2, the rotation of the motor 4 of the rotor beating part 2 could be variably controlled according to the raw material such as those having short fibers and those having no stiffness.

The rotor beating part 2 includes a first rotary blade 21 provided on an outer periphery of an end face of the rotor and a second rotary blade 23 provided in an annular shape on an inner side of the first rotary blade 21 and being the end face of the rotor, wherein the first rotary blade 21 and the second rotary blade 23 are provided on a rotor beating part main body 2A.

The stator beating part 1 is a fixed blade 11 arranged at an end portion of a first ring-shaped body and has a slit S2, and the fixed blade 11 is positioned between the first rotary blade 21 and the second rotary blade 23. Further, a second ring-shaped body 50 having a slit S4 for discharging the raw material beaten by the stator beating portion 1 and the rotor beating part 2 is positioned on an outer side of the first ring-shaped body.

According to the refiner R, even if the raw material is, for example, a material having short fibers or a material having no stiffness, the raw material could be beaten, not by adjusting the gap between the stator beating part 1 and the rotor beating part 2, but by variably controlling the rotation of the motor 4 of the rotor beating part 2 by the motor control part 5, similarly to the refiner R shown in FIGS. 1A-3C; and because the fixed blade 11 of the stator beating part 1 is positioned between the first rotary blade 21 and the second rotary blade 23, the beating effect of the raw material could be increased.

Note that reference numeral 60 shown in FIGS. 4A-4C, 5A-5B, 6A-6D, and 7A-7D is an attaching member for attaching the rotor beating part 2 to the rotating shaft 3 similarly to as shown in FIGS. 2 and 3A-3C.

What is claimed is:

1. A refiner for beating a raw material, the refiner comprising:
   a rotating shaft extending in an axial direction;
   a rotor beating part including:

a main body attached to the rotating shaft, and a rotary blade on an end face of the main body, the rotary blade extending from an outer periphery of the main body toward the rotating shaft in a radial direction of the rotating shaft;

a stator beating part including:

a first ring-shaped body, and a fixed blade on an end face of the first ring-shaped body facing the main body, the fixed blade extending from a center of the end face to an inner periphery of the first ring-shaped body, wherein a tip of the fixed blade and a tip of the rotary blade overlap each other in the axial direction; and a second ring-shaped body positioned on an outer side of the first ring-shaped body in the radial direction, the second ring-shaped body including a slit for discharging the raw material beaten by the stator beating part and the rotor beating part.

\* \* \* \* \*